United States Patent [19]
Dennison et al.

[11] Patent Number: 5,815,814
[45] Date of Patent: *Sep. 29, 1998

[54] CELLULAR TELEPHONE SYSTEM THAT USES POSITION OF A MOBILE UNIT TO MAKE CALL MANAGEMENT DECISIONS

[75] Inventors: Everett Dennison; Albert H. Pharis, Jr., both of Canfield, Ohio

[73] Assignee: Sygnet Communications, Inc., Canfield, Ohio

[*] Notice: The term of this patent shall not extend beyond the expiration date of Pat. No. 5,235,633.

[21] Appl. No.: 563,897

[22] Filed: Nov. 22, 1995

Related U.S. Application Data

[63] Continuation of Ser. No. 402,976, Mar. 13, 1995, abandoned, which is a continuation of Ser. No. 57,833, May 7, 1993, which is a continuation-in-part of Ser. No. 813,494, Dec. 26, 1991, Pat. No. 5,235,633.

[51] Int. Cl.$^6$ ........................................... H04Q 7/20
[52] U.S. Cl. .................... 455/456; 455/404; 455/406; 455/428; 342/450
[58] Field of Search ................ 379/59, 60, 58, 379/63, 112, 114, 144, 37, 45; 455/33.1, 33.2, 33.11, 404, 406–408, 436, 422, 427, 428, 432, 456, 457, 440; 342/450, 457; 370/111, 118, 477

[56] References Cited

U.S. PATENT DOCUMENTS

| | | | |
|---|---|---|---|
| 4,144,411 | 3/1979 | Frenkiel | 179/1 |
| 5,170,490 | 12/1992 | Cannon et al. | 370/111 |
| 5,214,789 | 5/1993 | George | 455/33.2 |
| 5,235,633 | 8/1993 | Dennison et al. | 379/60 |
| 5,303,297 | 4/1994 | Hillis | 379/63 |
| 5,321,514 | 6/1994 | Martinez | 455/33.2 |

FOREIGN PATENT DOCUMENTS 2-210923  8/1990  Japan .

*Primary Examiner*—Dwayne D. Bost
*Assistant Examiner*—Nay Maung
*Attorney, Agent, or Firm*—Terry M. Gernstein

[57] ABSTRACT

A cellular telephone system (20) includes a plurality of cell sites (14) and a mobile telephone switching office (MTSO, 12). Call management, including selection of a cell site most appropriate for a call associated with a mobile unit (M,M') are made based on the geographic location of the mobile unit as opposed to the strength of the signal associated with the call. The geographic location of the mobile unit is precisely determined using triangulation, a NAVSTAR global positioning system, or its equivalent. Each mobile unit includes a GPS receiver (24) that receives information from a geostationary satellite (22) to determine the precise location of the mobile unit. This position information is relayed to the cell site initially managing the mobile unit, and the mobile unit is handed off to a cell site that is most appropriate for the call. Initial selection of an entrance cell site is made based on signal strength, but further call management decisions are made based on location of the mobile unit.

17 Claims, 14 Drawing Sheets

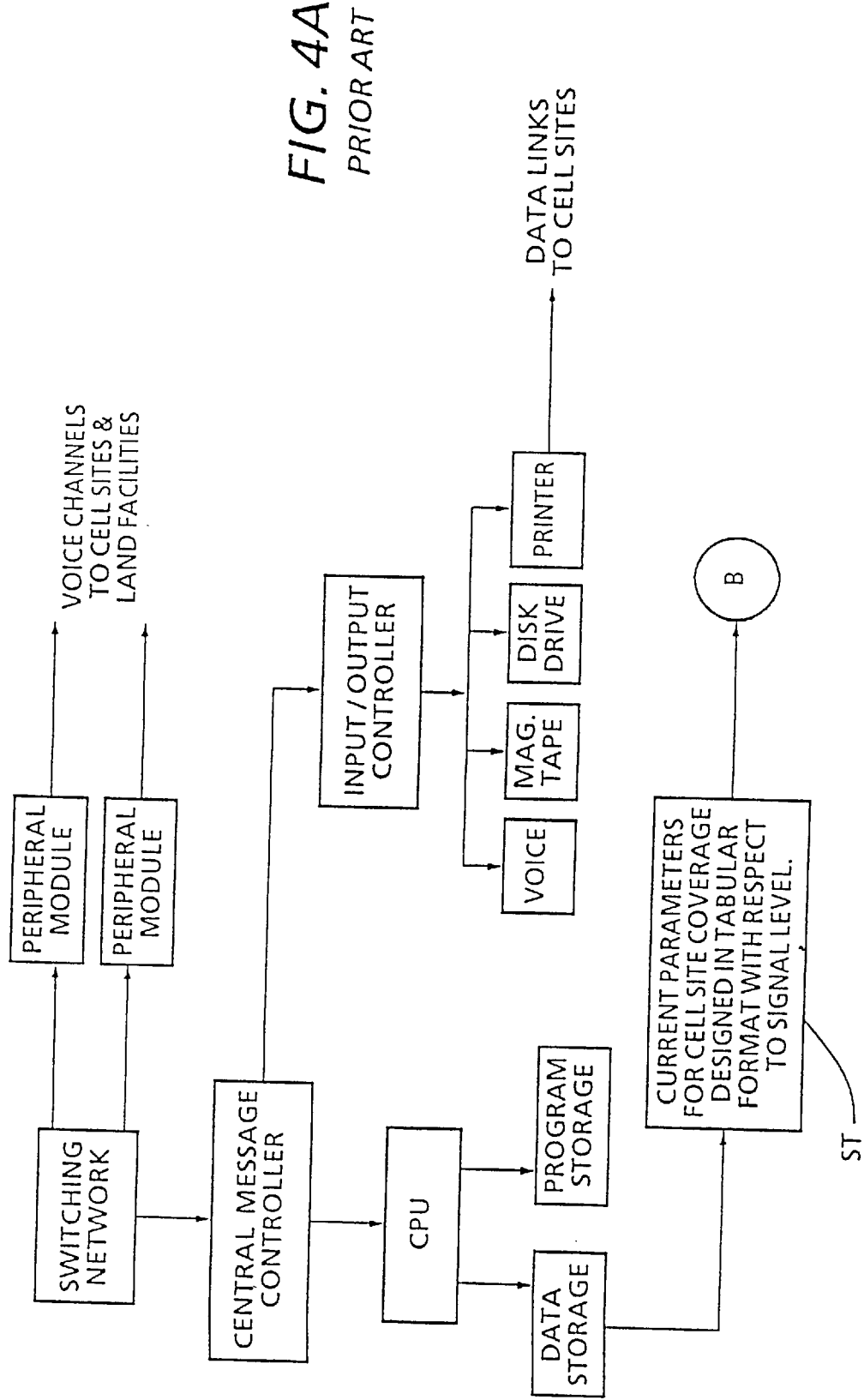
FIG. 4A *PRIOR ART*

LOOK-UP TABLE
Boundary Points
(minimum 4)

Cell Site #1
1 (Latitude, Longitude)
2 (Latitude, Longitude)
3 (Latitude, Longitude)
4 (Latitude, Longitude)
5 (Latitude, Longitude)

Cell Site #2
1 (Latitude, Longitude)
2 (Latitude, Longitude)
3 (Latitude, Longitude)
4 (Latitude, Longitude)

Cell Site #N

FIG. 9

CELLULAR TELEPHONE SYSTEM THAT USES POSITION OF A MOBILE UNIT TO MAKE CALL MANAGEMENT DECISIONS

This is a continuation of application Ser. No. 08/402,976 filed on Mar. 13, 1995 which was a continuation of Ser. No. 08/057,833, filed on May 7, 1993, now abandoned, which is a continuation in part of Ser. No. 07/813,494, filed Dec. 26, 1991 now U.S. Pat. No. 5,235,633.

TECHNICAL FIELD

The present invention relates to the general art of cellular mobile radiotelephone (CMR) technology, and to the particular field of managing the calls in a cellular system.

The present application is a continuation-in-part of Ser. No. 07/813,494 filed on Dec. 26, 1991, and incorporates the entire disclosure thereof by reference.

BACKGROUND ART

CMR is a rapidly growing telecommunications system. The typical CMR system includes a multiplicity of cells, such as indicated in FIG. 1. A particular geographic area is subdivided into a multiplicity of subareas, with each of the subareas being serviced by a stationary transmitter/receiver setup. The cells are set up to carry signals to and from mobile units M in the range of the cell. If one cell becomes too crowded, it can be divided into smaller cells, by a process known as cell splitting. As can be seen from FIG. 1, any particular geographic area can become quite complicated with cells overlapping each other, and overlapping cells of other neighboring cellular systems. It is noted that the term "cellular" is intended to be a term of convenience, and is not intended to be limiting. The present disclosure is intended to encompass any communication system in which an overall area can be divided into one or more subareas such as shown in FIG. 1.

A typical CMR set up is indicated in FIGS. 2 through 7, and will be described so an understanding of the problem to which this invention is directed can be obtained.

FIGS. 2, 3, 4 and 4A show a typical cellular telephone unit 2 having a unique mobile identification number stored in a suitable location such as an electrically erasable programmable read-only memory (not shown). Telephone units of this kind are known to those skilled in this art, and thus will not be described in detail.

The telephone unit 2 includes a handset 4 having a keypad 5 as well as a speaker 6 and a microphone 7. A transceiver 8, ordinarily built into the telephone unit 2, exchanges signals via an antenna 10 with a mobile telecommunications switching office or MTSO 12 via a cell site 14. A duplexer 15 connects the antenna to the transceiver. The cell site 14 includes an antenna 16 connected to a control terminal 17 via a transceiver 18. The cell 14 is connected to the MTSO via a transmission link 20.

Referring to FIGS. 4 and 5, the operation of the CMR can be understood. The mobile units communicate with the MTSO via cell sites. Under systems known prior to the parent application, the systems in the MTSO determine which cell site will handle the mobile unit based on the signal strength received by one or more cell sites in the system. The MTSO performs the decision making in providing service to the mobile units, controls the handoff process, contains subscriber information and performs telephone office switching functions. The mobile unit M moves about the geographic areas covered by the various cells as indicated in FIG. 1. As that mobile unit moves about, it decodes the overhead message control signals generated by various cell site control channels. The mobile unit locks onto the cell site that is emitting the strongest signal. The mobile unit rescans channels periodically to update its status. If, for example, a fixed-position land-based telephone T is used to call the mobile unit, a signal is sent via landlines L, to the central office CO of a public/switched telephone system (PTSN) 12A. This system then utilizes the switching network SN associated therewith to call the MTSO 12 via a transmission link L1. The MTSO then utilizes its own switching network and generates a page request signal to all cell sites via transmission links, such as the transmission link 20. The cell site which has been notified of the presence of the mobile unit M sends a signal back to the MTSO via the landlines alerting the MTSO of the presence of the mobile unit. The MTSO then orders the mobile unit, via the notifying cell site, to tune to an assigned channel and receive the call. Billing and other business information are recorded in the MTSO at this time.

On the other hand, during call origination, the mobile unit rescans the control channels to determine which is the best server based on signal strength. Upon selecting the best server, the mobile unit transmits call site information on the control channel receive frequency and then receives a voice channel to tune to if the mobile unit is authorized to place a call.

As the mobile unit moves, the signal strength between that mobile unit and the originating cell site changes, and perhaps diminishes. Since signal strength is an inverse function of the square of the distance between the mobile unit and the cell site, signal strength can change rapidly and drastically as the mobile unit moves with respect to the cell site and therefore must be monitored closely. Moreover, signal strength can be strongly affected by terrain, environmental conditions as well as interference from other sources. The MTSO has a signal strength table ST, and signal strength from the mobile unit is constantly compared to acceptable signal strength levels in the table. Such a table can be located in each cell site if desired.

Should signal strength diminish below a preset range, the MTSO generates a "locate request" signal to all cell sites that neighbor the original cell site. Each of such neighboring cell sites receiving a signal from the mobile unit signals the MTSO, and the signal strength from such neighboring cell sites are checked against the signal strength table. The MTSO makes a decision as to which cell site should control the call, and notifies the original cell site to order the mobile unit to retune to a voice channel of the new cell site.

As soon as the mobile unit retunes, the mobile unit completes the call via the new cell site channel. This transfer of control is known as a handoff.

While this method of making switching decisions has worked well in the past, the growth and sophistication of the cellular industry has resulted in severe drawbacks to this method. First, due to uneven terrain, unpredictable environmental conditions, interference and the like, many cellular companies have been required to construct numerous cell sites. These cells often overlap neighboring cell sites and provide redundant coverage. This is extremely expensive, not only from the standpoint of construction costs, but due to monitoring and staffing costs as well. Even at this, conditions can change so rapidly that coverage may still be inconsistent.

Still further, due to idiosyncrasies in terrain and environment, a mobile unit may use a cell that is located far from the mobile unit rather than a cell located immediately adjacent to that mobile unit. Hilly terrain is a common example of this problem. While this may not be a technical problem, it is important because a cellular company cannot assess long distance charges and/or message units to the calls. This deprives the cellular company of income that it could otherwise receive and customers of optimum service. Communities are also deprived of tax income that might be assessed against such calls as well.

Still further, since only signal strength is used to make switching decisions, the location of a caller is not ascertainable. This could be important in keeping track of calls.

Other problems that have been experienced in such cellular systems include the inability to completely control the cell site transmit signal, crosstalk noise interference, dropped calls, overlap and an inability to adequately service areas with undulating terrain without infringing the borders of other cellular territories.

Therefore, there is a need for a cellular system that can provide consistently high quality service, yet can do so with a minimum number of cell sites in a particular geographic area. Still further, there is a need for a cellular system that can accurately assess charges for all CMR services including message units for calls covering a certain distance within the geographic area.

Exact location through the use of Geopositional Satellite information (as explained in the parent application) is one improvement.

OBJECTS OF THE INVENTION

It is a main object of the present invention to provide a cellular system that can provide high quality service using only a minimum number of cell sites within a given geographic area.

It is another object of the present invention to improve the performance of the incorporated patent application.

It is another object of the present invention to provide a cellular system that uses the exact geographic location of a mobile unit in making call management decisions.

It is another object of the present invention to provide a cellular system that uses the exact geographic location of a mobile unit in making call management decisions, with that exact geographic location being determined using triangulation.

It is another object of the present invention to provide a cellular system that can accurately track a mobile unit within the geographic area covered by the cellular system.

It is another object of the present invention to provide a cellular system that can assess charges for calls based on the geographic location of the call.

DISCLOSURE OF INVENTION

These, and other, objects are achieved by a cellular system that makes switching and call management decisions based on the location of a mobile unit rather than on the strength of the signal associated with that mobile unit. The exact location of each mobile unit is determined using a Global Positioning System (GPS), LORAN, triangulation, or other position determining system. The NAVSTAR global positioning system, or GPS, is a system employing ultimately eighteen satellites in twelve hour orbits of 55° inclination. The system is being implemented by the Department of Defense for military use. However, it has a "clear access" (C/A) channel that is available for general civil use. The GPS is a passive navigation system on the part of the user, in that only reception of satellite-transmitted signals is required by the user to compute position. The GPS provides a capability for continuous position determination, and a position can be computed on the order of every second of time, and thus provides a capability of determining the position of a highly mobile vehicle. A full discussion of the GPS is presented in textbooks, such as "Handbook of Modern Electronics and Electrical Engineering," edited by Charles Belove and published in 1986 by Wiley-Interscience (see chapter 54 thereof, the disclosure of which is incorporated herein by reference), and includes a satellite positioned in a geostationary orbit and communicating with ground-based receivers. Based on the signals received from the satellite, the exact position in longitude and latitude, of the ground-based receiver can be determined with an extremely high degree of accuracy and precision.

The exact longitude and latitude of the mobile unit is then communicated to the MTSO, and the cell site that services that particular position is signalled by the MTSO to carry the call associated with the mobile unit. The position of the mobile unit is constantly updated, and call management decisions, such as handoffs, can be made based on the location of the mobile unit rather than the strength of the signal associated with that unit. The MTSO has a look-up table in its data storage facilities that compares positional data from the mobile units to data associated with cell site coverage areas. Based on a look up in this table, the MTSO can select the cell site most appropriate to a call.

Since the position of the mobile unit is known to the MTSO, the assessment of message units, taxes, and other charges can be made. The billing will be more consistent than is possible with present systems. Of course, call routing will be greatly improved in the system of the present invention as compared to prior systems.

Still further, since call management decisions are made based on position of the mobile unit, the number of cell sites can be reduced as communication is not subject to vagaries of weather or the like to the degree that call management decisions based on signal strength are. Even with the reduced number of cell sites, the quality of calls using such a system is improved due to proper handoff. The system is quite flexible, and cell site placement and frequency reuse are extremely efficient since call management is much more precise than in systems that use signal strength to make call management decisions.

The cellular system of the present invention in which call management decisions are made based on position of the mobile unit can reduce or eliminate the provision of cellular service beyond the authorized area, in effect reducing the interference to and from neighboring cellular carriers (reduction of inter-system interference) and more precisely define the inter-system service boundaries and handoff parameters. This system also permits precise definition of service boundaries for individual cell sites thereby allowing for greater system control and the reduction of intra-system interference. Still further, accurate and detailed cell site usage and traffic pattern data can be developed in the present system, thereby enabling accurate and precise control of system growth. The present cellular system can also be real-time tailored based on current cellular use.

BRIEF DESCRIPTION OF DRAWINGS

FIG. 4A is a block diagram showng systems included in the MTSO shown in FIG. 4.

FIG. 9 illustrates a look-up table that is incorporated into the MTSO of the present invention to make call management decisions based on the location of a mobile unit.

BEST MODE FOR CARRYING OUT THE INVENTION

Figure 1:
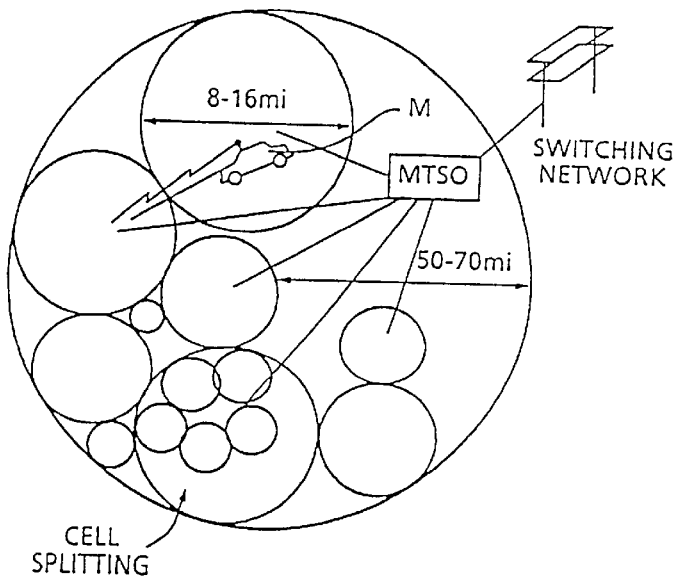
FIG. 1 illustrates a geographic area divided into a multiplicity of cells.
Figure 2:
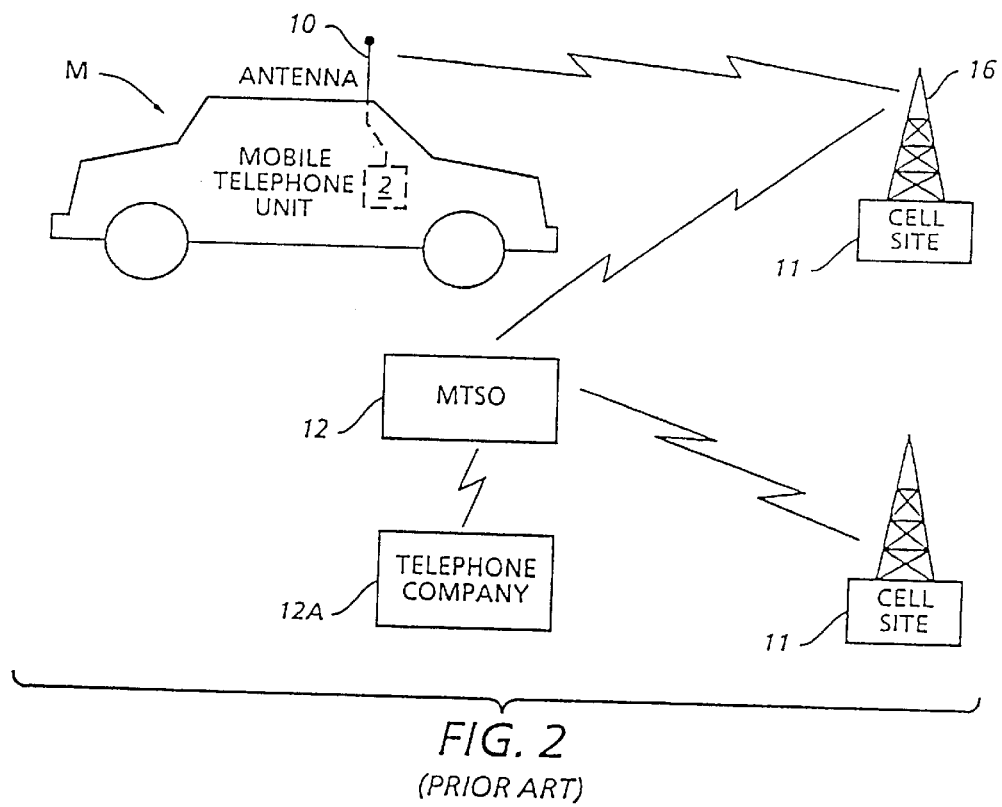
FIG. 2 illustrates a typical prior art mobile cellular telephone and its link with a fixed cell site and an MTSO.
Figure 3:
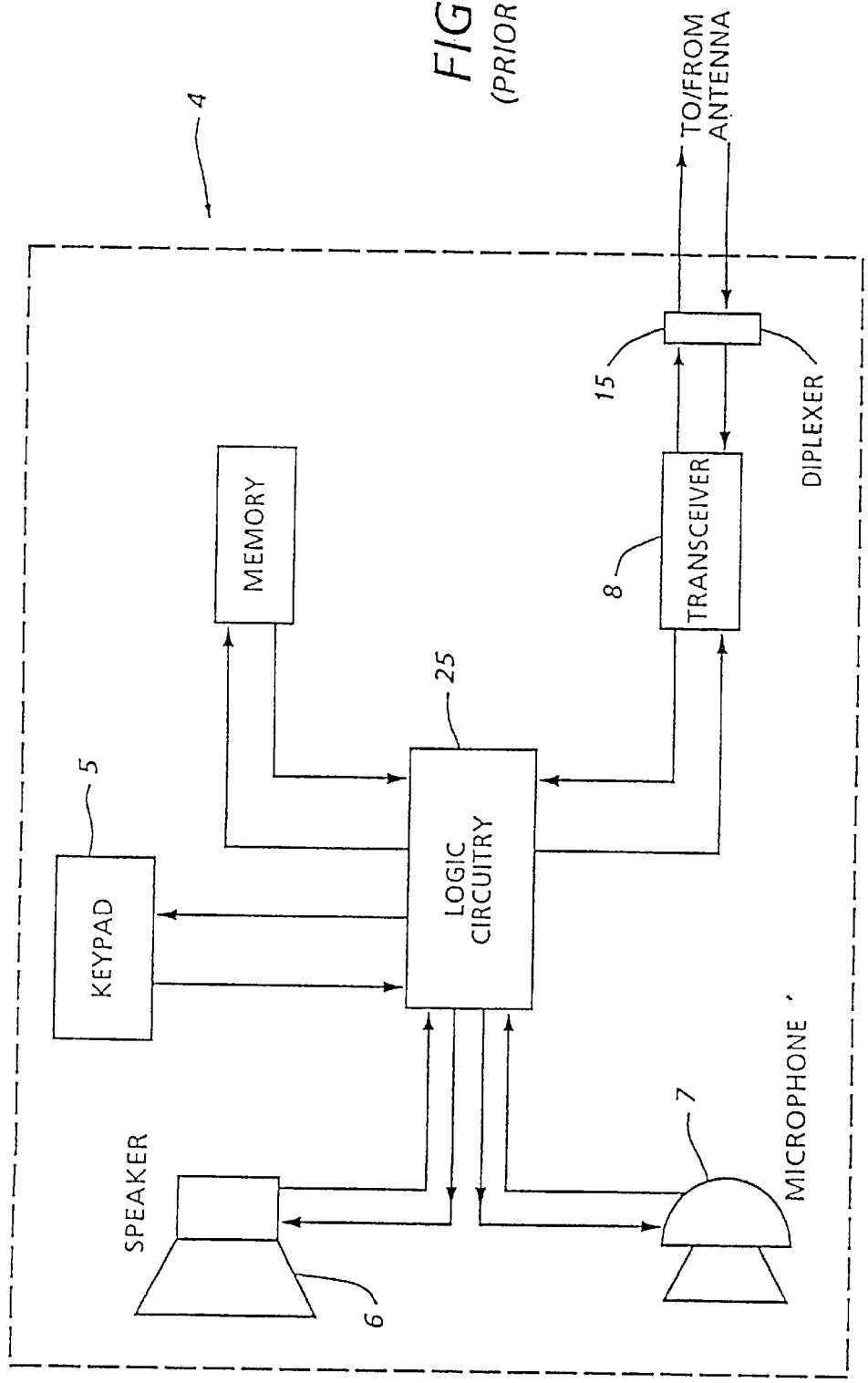
FIG. 3 illustrates the mobile unit of the cellular telephone system shown in FIG. 2.
Figure 4:
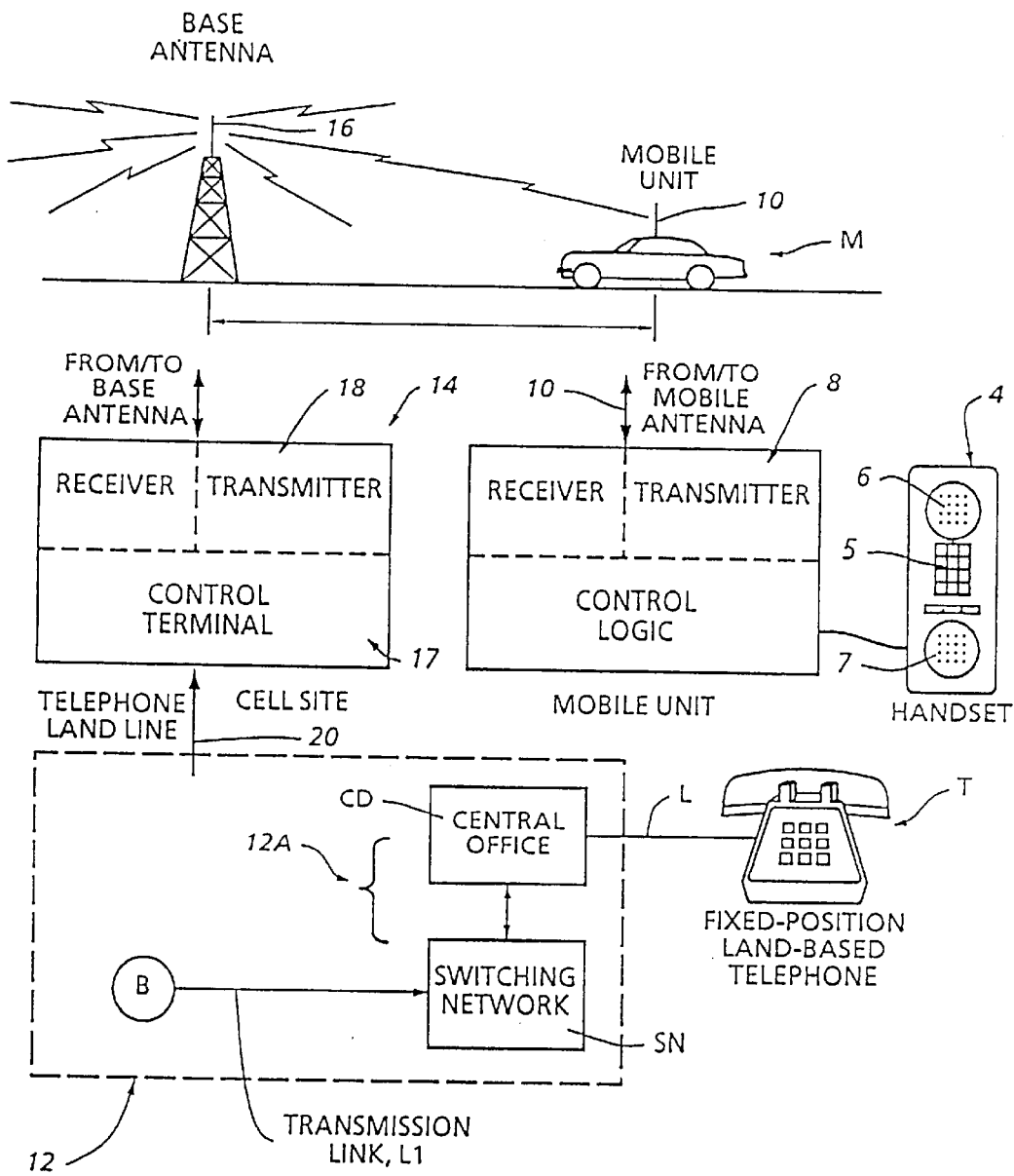
FIG. 4 illustrates a typical prior art cellular system in which a mobile unit can be connected with a fixed-position unit.
Figure 5:
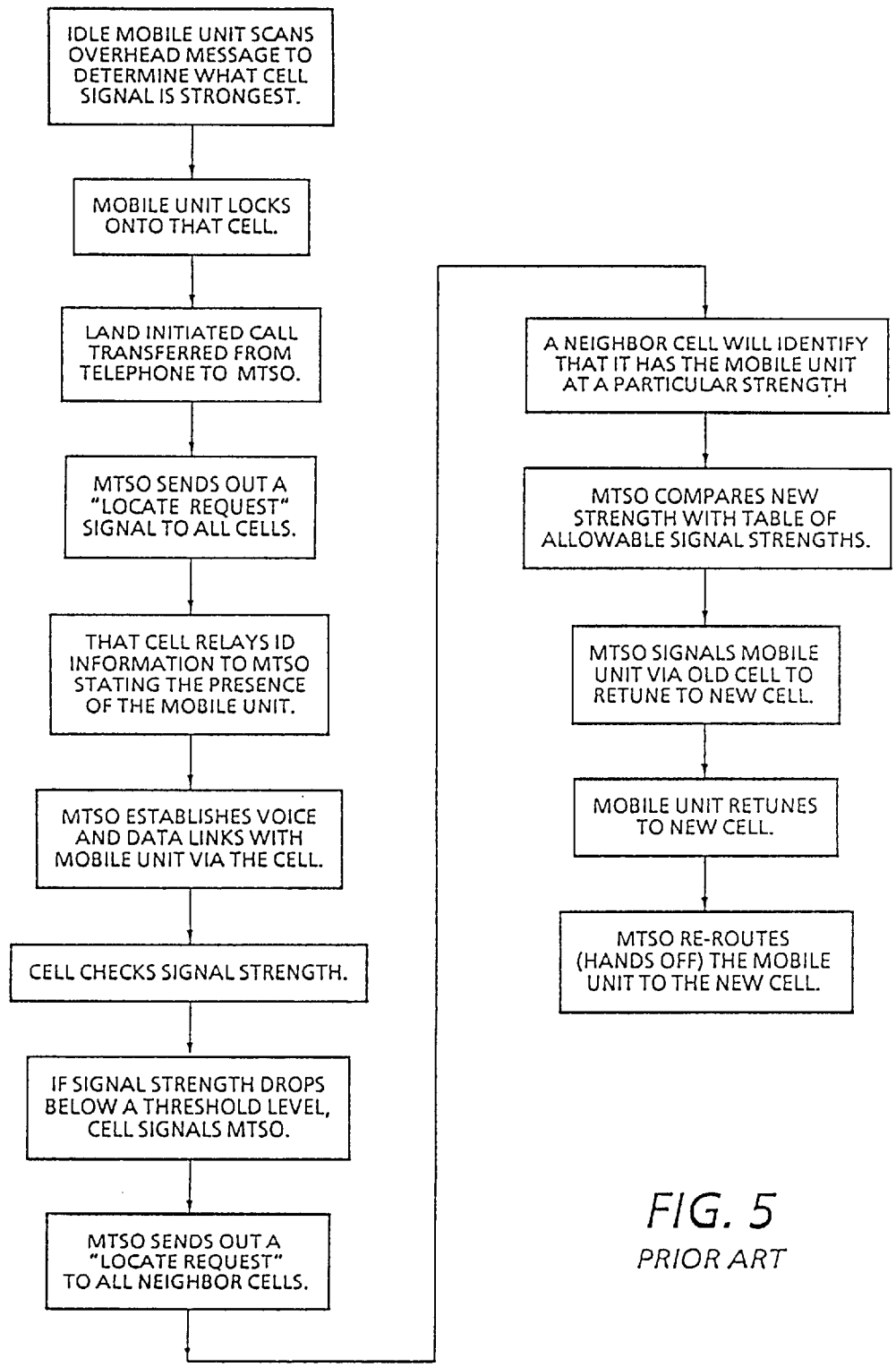
FIG. 5 is a flow diagram of a call originated by the PTSN (public service telephone network) and a mobile unit using a prior art cellular system.
Figure 6:
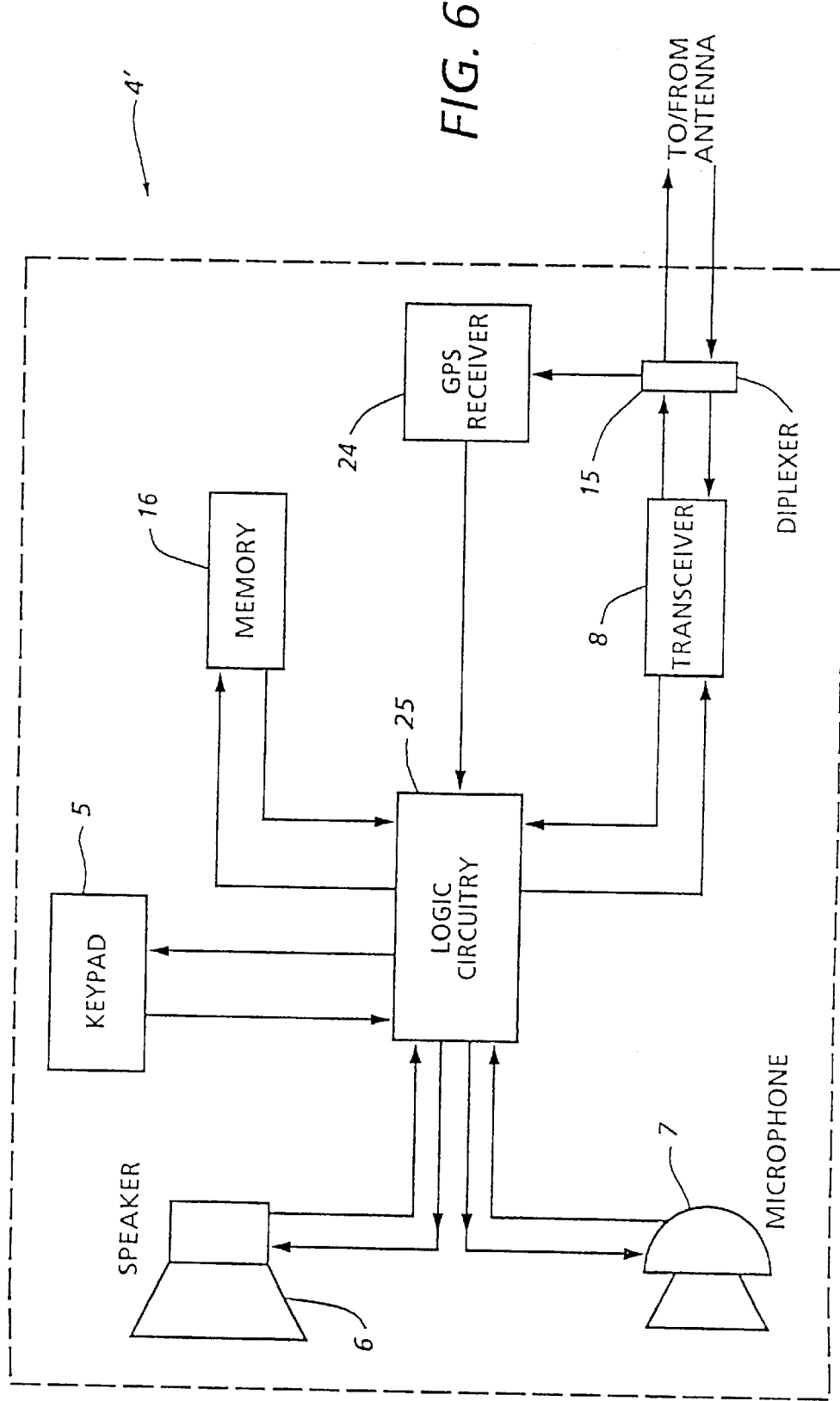
FIG. 6 is a block diagram of a mobile unit of a cellular telephone system which incorporates a GPS location determining system embodying the present invention.
Figure 7:
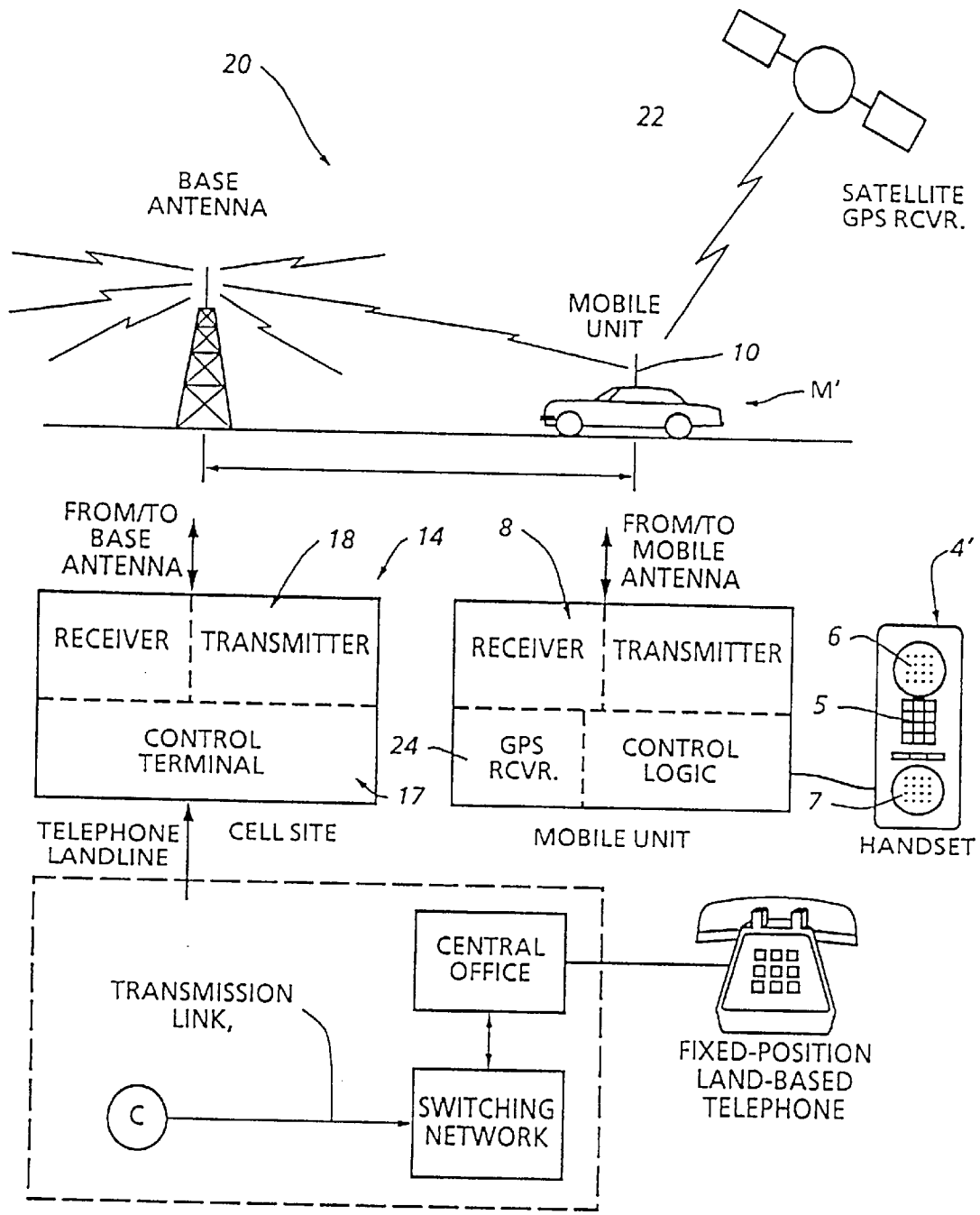
FIG. 7 illustrates a cellular system incorporating a GPS position locating system for a mobile unit communicating with other units, such as the fixed-position unit shown.
Figure 7A:
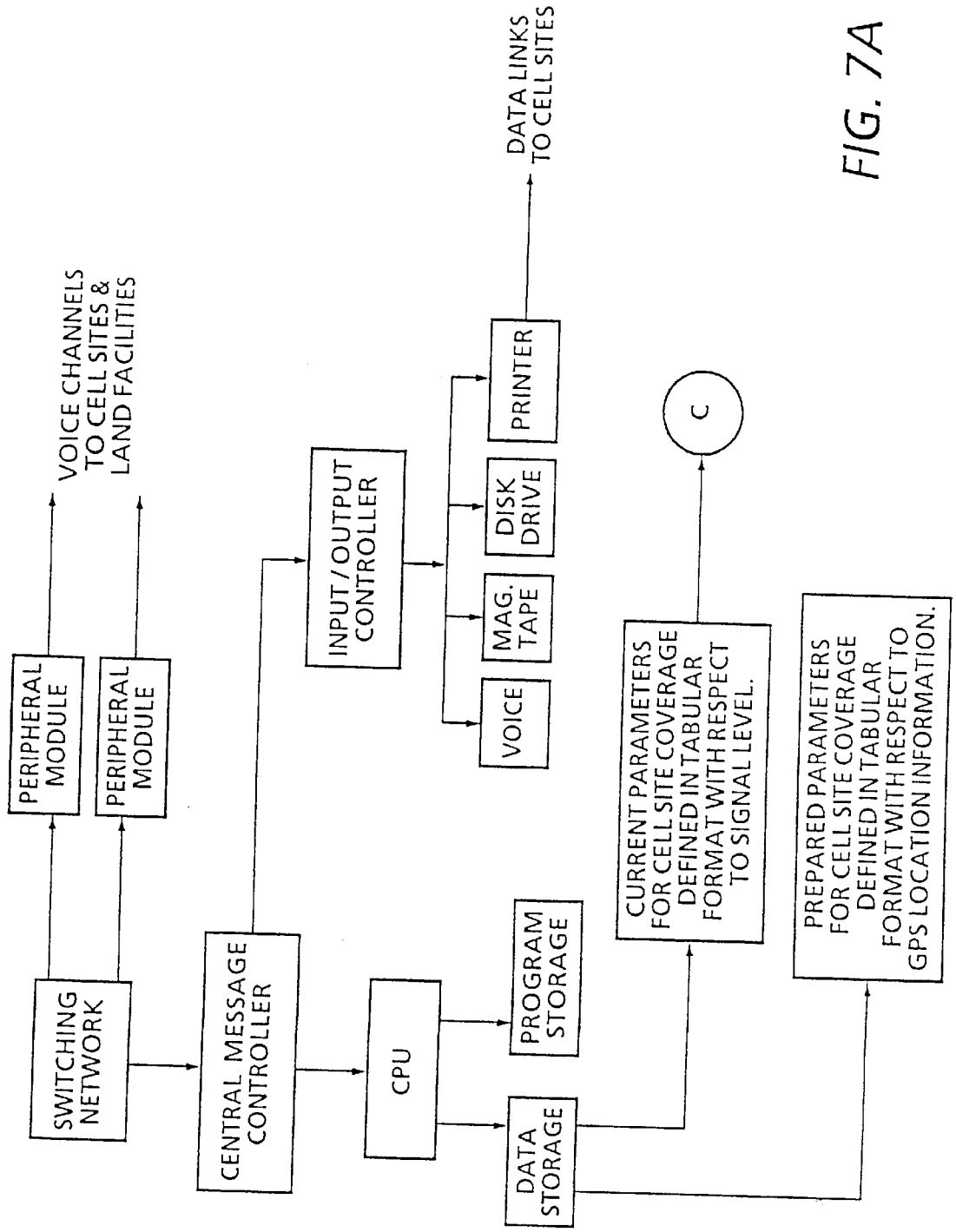
FIG. 7A is a block diagram showing systems included in the MTSO shown in FIG. 7.

Shown in FIGS. 6, 7 and 7A is a cellular system 20 embodying the present invention. The cellular system 20 uses positional data associated with the mobile unit M' to make call management decisions. To this end, the cellular system 20, while similar in all other respects to the cellular system illustrated in FIGS. 2 and 3, includes means for accurately and precisely determining the exact position of the mobile unit M', and then further includes means for using this positional information to determine which cell site is best suited to handle a call associated with that mobile unit M'.

The means for accurately determining the precise position of the mobile unit includes a Global Positioning System. The GPS includes satellites, such as satellite 22 in orbit about the earth. Each mobile unit further includes a GPS receiver 24 located between the duplexer and the logic circuitry 25 of the mobile unit. The GPS receiver communicates with the satellite 22 and the exact longitude and latitude of the mobile unit are determined. This information is sent to the MTSO via a cell site, and the MTSO uses a look-up table such as disclosed in FIG. 9, containing the geographic location of each cell site in the cellular system, to determine which cell site is most appropriate for use by the mobile unit. The mobile unit communicates with cell sites using unused bits of the aforediscussed overhead messages to send its positional information to the MTSO when the mobile unit is first activated. This positional information is relayed to the MTSO by the first cell site to communicate with the mobile unit. The MTSO then selects the cell site most appropriate for the mobile unit and hands that mobile unit off to that cell site. The cell sites transmit system service boundaries in their overhead messages that are interpreted by mobile units. The mobile units use the location information supplied by the GPS receiver as opposed to signal strength to determine which system to originate on. Call termination can utilize the paging process as is currently utilized. A response from a mobile unit includes the location information, and the designated control channel instructs the mobile unit to tune to one of its channels. A call in progress utilizes the overhead message of the voice channel to communicate location information. Once a mobile unit that is call processing on a particular site crosses a cell boundary, it is instructed to perform a handoff to the cell that is to service the new location. It is understood that the GPS is used as an example of the preferred source of positional data; however, other sources similar to the GPS can be used without departing from the scope of the present invention. All that is required is that the source of positional data be able to generate precise and accurate locational data on a fixed or a rapidly moving object. It is also helpful, but not absolutely required, that the CMR be only passively involved in the determination of the positional data.

The handoff process is similar to the present handoff processes, except it will be controlled according to position of the mobile unit instead of signal strength. This position information is used to determine call rating and taxing for billing purposes and call routing to make sure that the proper services for that location are provided.

Figure 8:
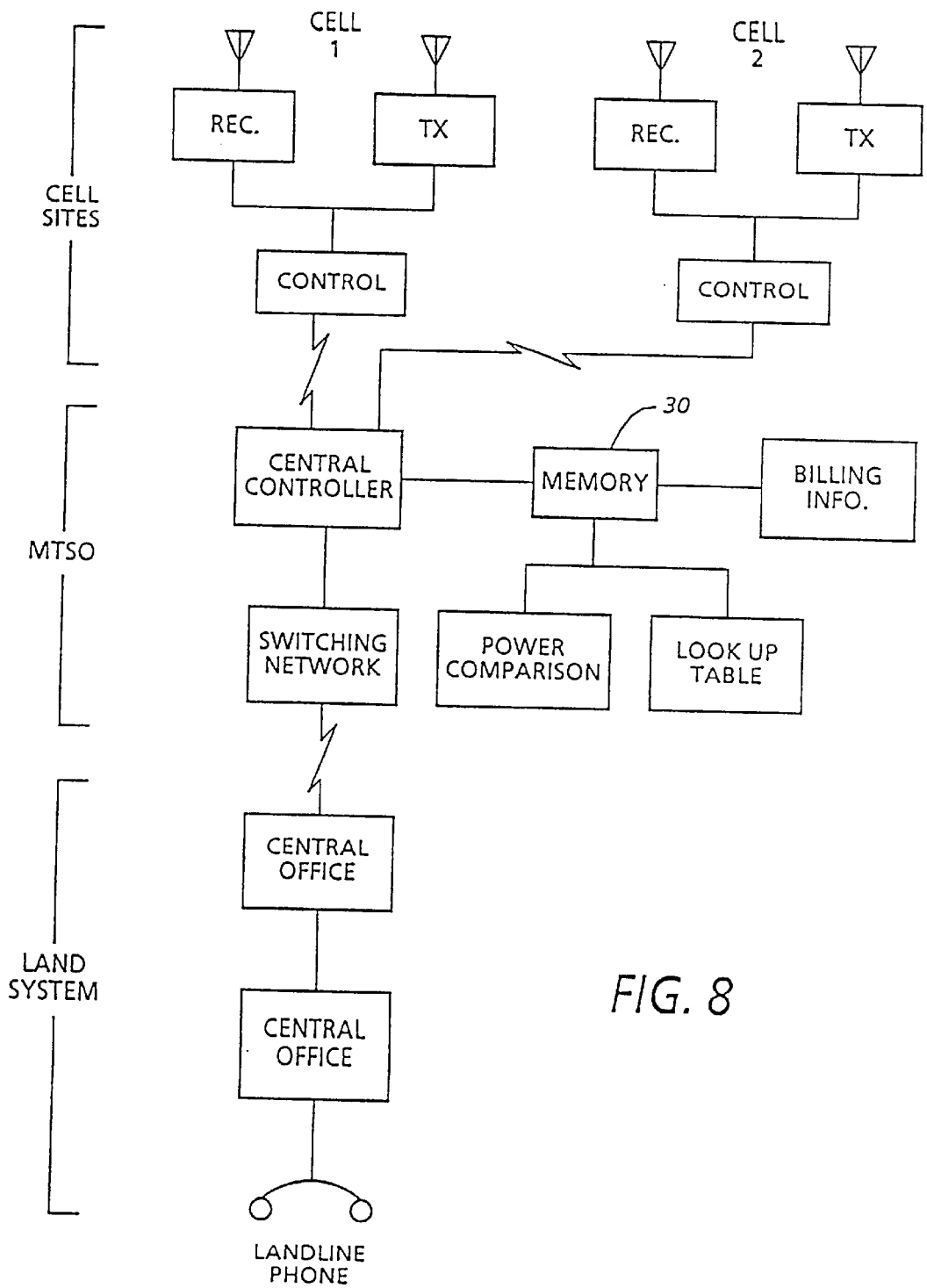
FIG. 8 is a block diagram illustrating the cellular system embodying the present invention.

A "locate request" signal is not used, since the exact location of the mobile unit is known to the MTSO. However, as indicated in FIG. 8, a signal strength method can also be used in making call management decisions if suitable. Such a process would be used if the mobile unit moves into a prior art cellular system.

Figure 11A:
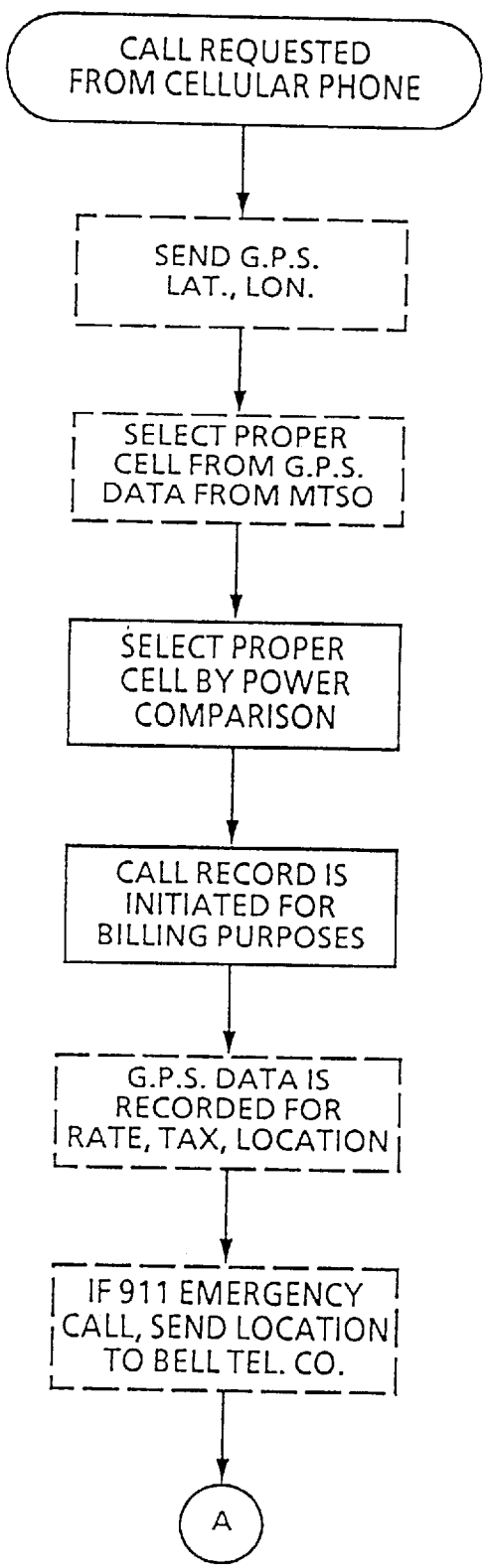
FIGS. 11A and 11B comprise a flow chart illustrating a call sequence between a mobile unit and another unit in which switching decisions are made based on the position of the mobile unit rather than the strength of the signal associated with the mobile unit.
Figure 11B:
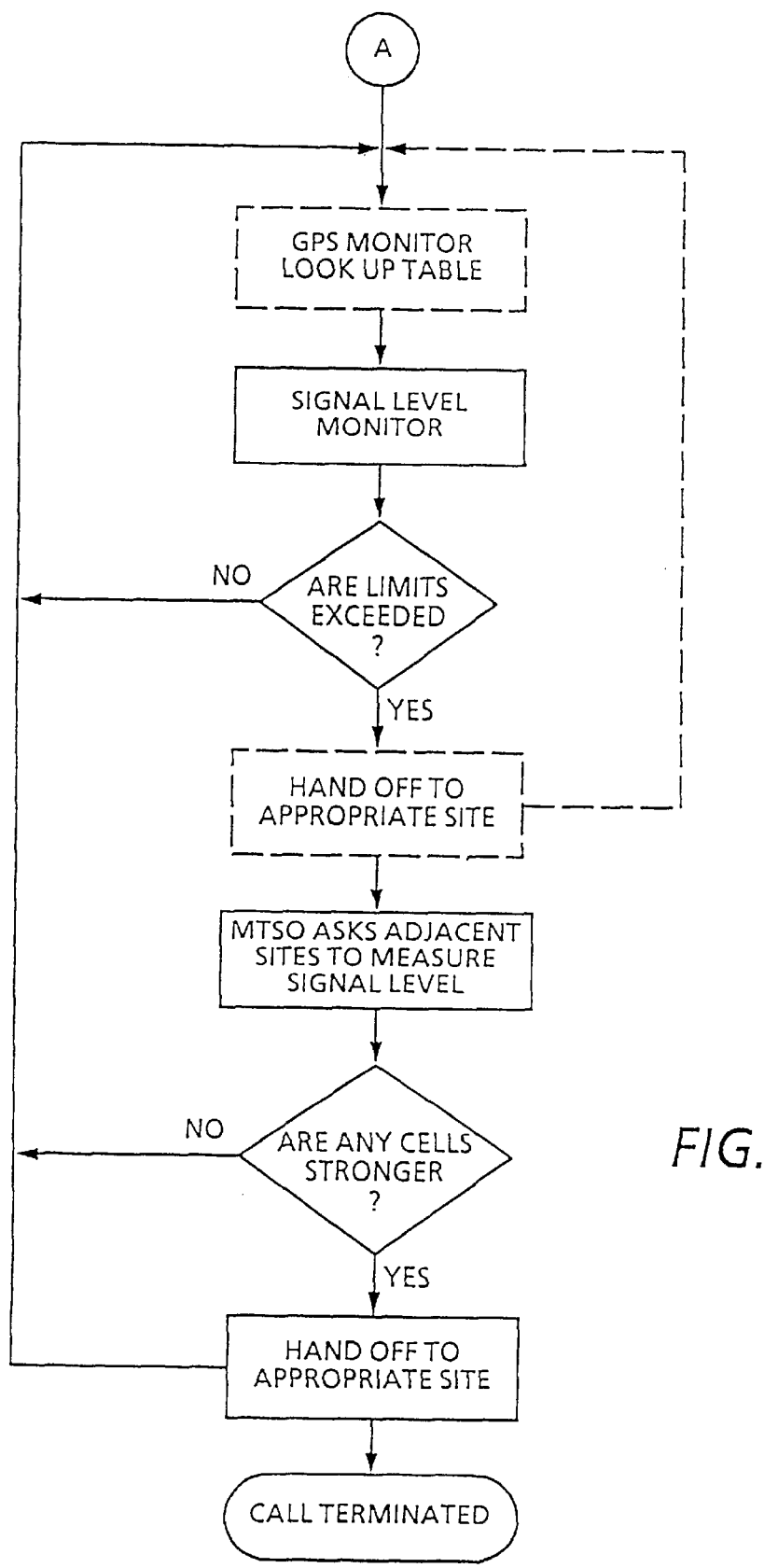

A call using the cellular system of the present invention is illustrated in FIG. 11. Initial communication between a mobile unit and the MTSO is established using the overhead communication network described above. The mobile unit scans marker channels and initially locks onto the cell site that has the strongest signal. This cell site may not be the most appropriate cell site for use by that mobile unit, but it serves as an entrè into the system. Once this initial communication is established, the mobile unit uses the GPS receiver 24 and GPS satellite 22 and to determine its exact longitude and latitude. This information is then relayed to the MTSO using the originating cell site. The MTSO uses this information in conjunction with a look-up table such as shown in FIG. 9 to establish communication between the mobile unit and the cell site most appropriate to that mobile unit. The mobile unit is then handed off to that cell site. A call initiated by that mobile unit is routed through the appropriate cell site.

Figure 10:
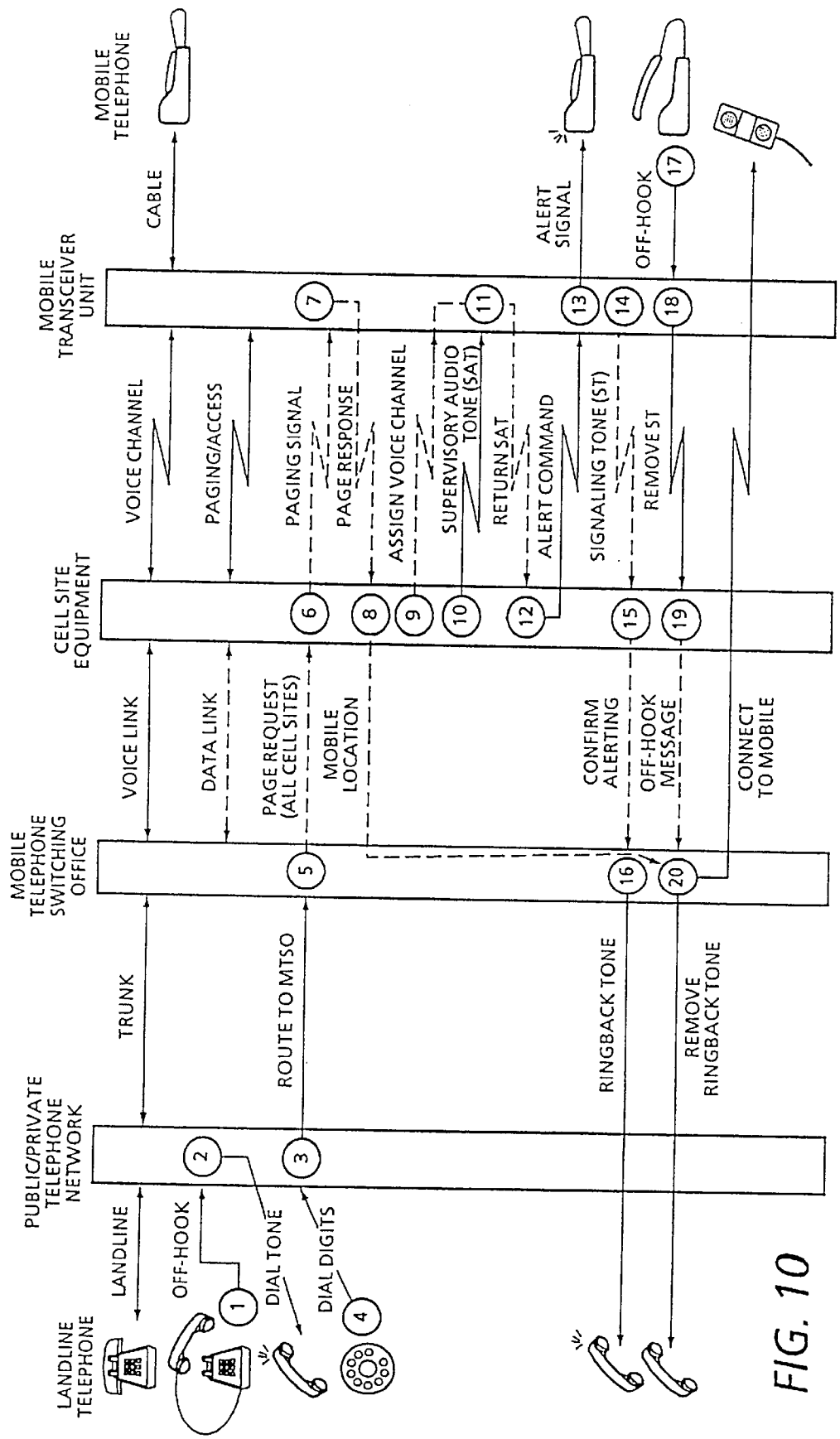
FIG. 10 is a block diagram illustrating a landline-to-mobile unit call in which position data are exchanged between the mobile unit and the MTSO.

As indicated in FIG. 11, business information associated with the call, can be recorded at the MTSO. As indicated in FIG. 10, the dotted lines represent data transmission that contains GPS information. It is also noted that since both a position controlled system and a signal strength system are included in the cellular system of the present invention, the MTSO can include a software system in the memory 30 shown in FIG. 8 to use the position controlled system, but to also test signal strength, and to use a signal strength controlled system if a signal still falls below a predetermined value when making call management decisions based on the position of the mobile unit. In this manner, the best of both systems can be obtained.

The system of the present invention can also be used to allow a mobile to place calls only on its home system at the decision of the mobile. The mobile locating features of the system could also be important in other contexts, such as emergencies or the like.

Figure 12:
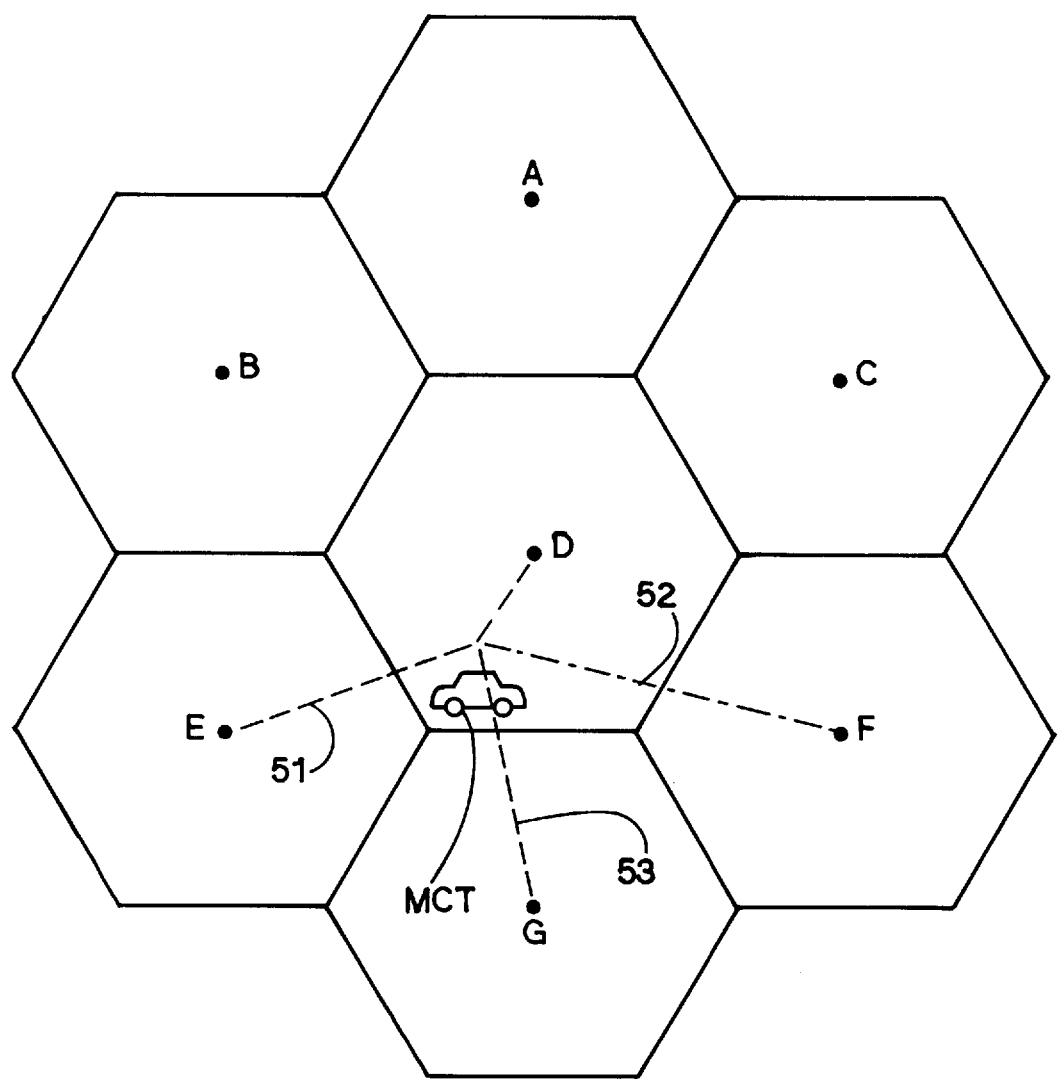
FIG. 12 illustrates a method of locating a mobile unit using triangulation, with the location being used to make call management decisions.

The use of triangulation is another means of providing mobile location information to the MTSO for the purpose of making intelligent switch management decisions based on the exact geographic location of the mobile unit. This method is illustrated in FIG. 12, and allows the MTSO to determine the exact location of a mobile cellular telephone MCT by using the received mobile signal S1, S2 and S3 from three or more cell sites E, F, and G, respectively. Through the precise timing of the received signal at three or more sites, the MTSO can then determine the exact location of the mobile phone in relation to the intended coverage area of each given cell site in the system. The MTSO can include circuits to compensate for the time delay difference between sites of the received mobile signal and use those signals to determine the distance from each site. The system also includes a computer that can locate the mobile location in relation to the geographic size of each cell site.

The MTSO will have a set of look-up tables, as does the previously proposed system in the parent application, that are used to determine the shape and location of the individual cell sites.

Like the GPS system disclosed in the parent application, if the MTSO fails to receive exact mobile location information by either the triangulation system or from the GPS data, the MTSO can then default to the original method of making cell site decisions based simply on signal strength alone.

It is understood that while certain forms of the present invention have been illustrated and described herein, it is not to be limited to the specific forms or arrangements of parts described and shown.

We claim:

1. A wireless radio communications system such as a cellular telephone, that includes more than one cell site and one or more mobile telephone switching offices (MTSO), said system comprising:

A) locating means in a radio communications system for determining the exact geographic location of a mobile unit;

B) management means in each MTSO of the system for making call management decisions based on the geographic location of the mobile unit, said management means including means for storing the geographic location, shape and size of each cell site in the communications system and for comparing the exact geographic location of the mobile unit to the geographic location of each cell site and for selecting a cell site for use by the mobile unit based on such comparison, said management means including means for receiving mobile signals from three or more cell sites, circuit means for compensating for time delay of said signals from said three or more cell sites and means for determining distance between each cell site and the mobile unit by triangulation, means for locating the mobile unit in relation to the geographic size of each cell site, and means for providing billing information irrespective of cell site location; and C) means for call routing to provide proper services for the mobile unit based on the location of the mobile unit.

2. A wireless radio communications system such as a cellular telephone system, that includes one or more intra-system cell sites, a system boundary and an MTSO, the wireless radio communications system being located adjacent to at least one neighboring wireless radio communications system carrier having its own cell sites which are inter-system cell sites with respect to the wireless radio communications system, the wireless radio communications system being authorized to provide service to calls handled by the intra-system cell sites, the wireless radio communications system and the neighboring wireless radio communications system carrier being subject to inter-system interference, said wireless radio communications system comprising:

A) locating means in a radio communications system for determining the exact geographic location of a mobile unit; and B) management means in each MTSO of the wireless radio communications system for making call management decisions based on the geographic location of the mobile unit, said management means including means for storing the geographic location, shape and size of each cell site in the wireless radio communications system and for comparing the exact geographic location of the mobile unit to the geographic location of each cell site and for selecting a cell site for use by the mobile unit based on such comparison, said management means including means for receiving mobile signals from three or more cell sites, circuit means for compensating for time delay of said signals from said three or more cell sites and means for determining distance between each cell site and the mobile unit by triangulation, means for locating the mobile unit in relation to the geographic location of each cell site, and data means in said management means responsive to said locating means for automatically routing a call to completion to provide services requested by a mobile unit user based on the exact geographic location of the mobile unit regardless of cell site location.

3. A wireless radio communications set-up comprising:

A) a wireless radio communications system;

B) a system boundary defining an authorized area for said wireless radio communications system;

C) at least one intra-system cell site that provides service within said authorized area;

D) an MTSO for said wireless radio communications system;

E) a neighboring wireless carrier that provides service outside of said authorized area;

F) at least one inter-system cell site that provides service outside of said authorized area, said at least one inter-system cell site being associated with said neighboring wireless carrier;

G) said wireless radio communications system and said neighboring wireless carrier being subject to inter-system interference;

H) locating means for determining the exact geographic location of a mobile unit, said locating means including means for storing the geographic location, shape and size of each cell site in the wireless radio communications system and for comparing the exact geographic location of the mobile unit to the geographic location of each cell site and for selecting a chosen cell site for use by the mobile unit based on such comparison and accepting the call from said mobile unit if the chosen cell site provides service within said authorized area for reducing provision of service by said wireless radio communications system outside of said authorized area and reducing interference between said wireless radio communications system and said neighboring wireless carrier, and means for receiving mobile signals from three or more cell sites, circuit means for compensating for time delay of said signals from said three or more cell sites and means for determining distance between each cell site and the mobile unit by triangulation, and means for locating the mobile unit in relation to the geographic location of each cell site; and I) data means in said management means responsive to said locating means for automatically routing and completing a call to an emergency service provider to provide services requested by a mobile unit user based on the exact geographic location of the mobile unit regardless of cell site location.

4. A wireless radio communications system such as a cellular telephone, that includes one or more elements and one or more mobile telephone switching offices (MTSO), said system comprising:

A) locating means in a radio communications system for determining the exact geographic location of a mobile unit; and B) management means in each MTSO of the system for making call management decisions based on the geographic location of the mobile unit, said management means including means for storing the geographic location of each element in the communications system and for comparing the exact geographic location of the mobile unit to the geographic location of each element and for selecting an element for use by the mobile unit based on such comparison, said management means including means for receiving mobile signals from three or more cell sites, circuit means for compensating for time delay of said signals from said three or more cell sites and means for determining distance between each cell site and the mobile unit by triangulation, and means for providing billing information based on the location of the mobile unit with the billing information being independent of the geographic location of any cell site.

5. A wireless radio communications system such as a cellular telephone, that includes one or more intra-system cell sites, a system boundary and an MTSO, the wireless radio communications system being located adjacent to at least one neighboring wireless radio communications system carrier having its own cell sites which are inter-system cell sites with respect to the wireless radio communications system, the wireless radio communications system being authorized to provide service to calls handled by the intra-system cell sites, the wireless radio communications system and the neighboring wireless radio communications system carrier being subject to inter-system interference, said wireless radio communications system comprising:

A) locating means in a radio communications system for determining the exact geographic location of a mobile unit; and B) management means in each MTSO of the wireless radio communications system for making call management decisions based on the geographic location of the mobile unit, said management means including means for storing the geographic location, shape and size of each cell site in the wireless radio communications system and for comparing the exact geographic location of the mobile unit to the geographic location of each cell site and for selecting a cell site for use by the mobile unit based on such comparison, said management means including means for receiving mobile signals from three or more cell sites, circuit means for compensating for time delay of said signals from said three or more cell sites and means for determining distance between each cell site and the mobile unit by triangulation, means for locating the mobile unit in relation to the geographic size of each cell site, and means for providing taxing information based on the location of the mobile unit independent of the geographic location of any cell site.

6. A wireless radio communications set-up comprising:

A) a wireless radio communications system;

B) a system boundary defining an authorized area for said wireless radio communications system;

C) at least one intra-system cell site that provides service within said authorized area;

D) an MTSO for said wireless radio communications system;

E) a neighboring wireless carrier that provides service outside of said authorized area;

F) at least one inter-system cell site that provides service outside of said authorized area, said at least one inter-system cell site being associated with said neighboring wireless carrier;

G) said wireless radio communications system and said neighboring wireless carrier being subject to inter-system interference;

H) locating means for determining the exact geographic location of a mobile unit, said locating means including means for storing the geographic location, shape and size of each cell site in the wireless radio communications system and for comparing the exact geographic location of the mobile unit to the geographic location of each cell site and for selecting a chosen cell site for use by the mobile unit based on such comparison and accepting the call from said mobile unit if the chosen cell site provides service within said authorized area for reducing provision of service by said wireless radio communications system outside of said authorized area and reducing interference between said wireless radio communications system and said neighboring wireless carrier, and means for receiving mobile signals from three or more cell sites, circuit means for compensating for time delay of said signals from said three or more cell sites and means for determining distance between each cell site and the mobile unit by triangulation, and means for locating the mobile unit in relation to the geographic size of each cell site; and I) means for providing taxing information based on the location of the mobile unit independent of the geographic location of any cell site.

7. A wireless radio communications system such as a cellular telephone system, that includes a plurality of elements, such as land based sites, and one or more mobile telephone switching offices (MTSO), said system comprising:

A) locating means in a radio communications system for determining the exact geographic location of a mobile unit; and B) management means in each MTSO of the system for making call management decisions based on the geographic location of the mobile unit, said management means including means for storing the geographic location co-ordinates of each element in the communications system and for comparing the exact geographic location of the mobile unit to the geographic location of a chosen element, said management means including means for receiving signals from a plurality of cell sites, circuit means for analyzing said signals and means for determining distance between each cell site and the mobile unit by triangulation, and data means in said management means responsive to said locating means for automatically routing to completion a call placed by a mobile unit, to provide services requested by a mobile unit user based on the exact geographic location of the mobile unit independent of cell site geographic location.

8. A wireless radio communications system such as a cellular telephone system, that includes a plurality of elements such as land based sites, and one or more mobile telephone switching offices (MTSO), said system comprising:

A) locating means in a radio communications system for determining the exact geographic location of a mobile unit; and B) management means in each MTSO of the system for making call management decisions based on the geographic location of the mobile unit, said management means including means for storing the geographic location co-ordinates of each element in the communications system and for comparing the exact geographic location of the mobile unit to the geographic location of a chosen element, said management means including means for receiving signals from a plurality of cell sites, circuit means for analyzing said signals and means for determining distance between each cell site and the mobile unit by triangulation, and means for providing billing information based on the location of the mobile unit independent of the geographic location of any cell site, and data means in said management means responsive to said locating means for automatically routing and completing a call made by a mobile unit to provide services requested by a mobile unit user based on the exact geographic location of the mobile unit regardless of the location of a cell site.

9. The wireless radio communications system defined in claim 7 wherein said management means further includes means for providing billing information.

10. The wireless radio communications system defined in claim 8 wherein said management means further includes means for providing taxing information with the taxing information being independent of the geographic location of any cell site.

11. The wireless radio communications system defined in claim 9 wherein said management means further includes means for providing taxing information with the taxing information being independent of the geographic location of any cell site.

12. The wireless radio communications system defined in claim 1 further including means for providing taxing information.

13. The wireless radio communications system defined in claim 2 further including means for providing billing information.

14. The wireless radio communications system defined in claim 13 further including means for providing taxing information.

15. The wireless radio communications set-up defined in claim 3 further including means for providing billing information.

16. The wireless radio communications set-up defined in claim 15 further including means for providing taxing information.

17. The wireless radio communications system defined in claim 4 further including means for providing taxing information.

* * * * *